INVENTORS
Solomon Heytow
Richard H. Peterson
BY 2,712,040

VOLUME ATTENUATOR

Solomon Heytow and Richard H. Peterson, Chicago, Ill.

Application November 20, 1952, Serial No. 321,687

18 Claims. (Cl. 179—171)

Our invention relates to electronics and includes among its objects and advantages improved volume control means. In one embodiment the control is manual control by the operator. In another embodiment the control is an automatic function of the signal input, so that the entirety is an automatic volume compressor when used in the inverse sense. It is also possible to employ both the automatic and the manual controls simultaneously.

Figure 1:
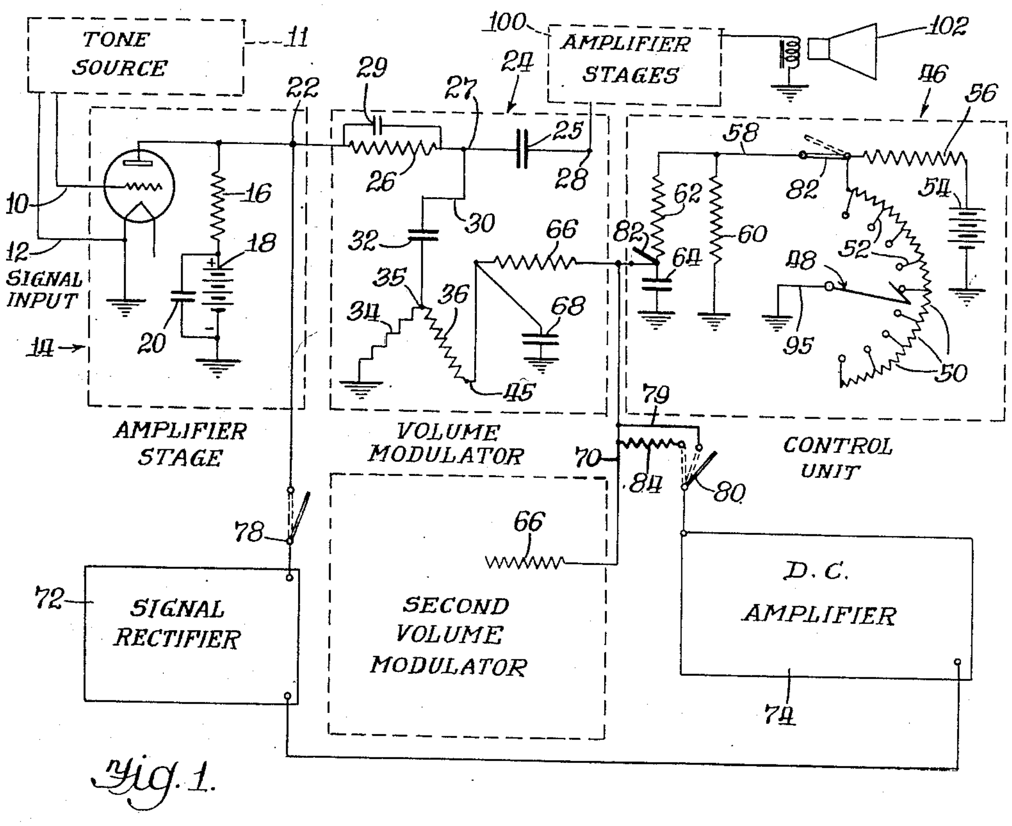
Figure 1 is a schematic diagram of a composite unit according to invention.

In the embodiment of the invention selected for illustration, the signal input is applied to the terminals 10 and 12 of the triode of an amplifier stage 14. The signal may be an oscillation corresponding to a musical tone, from any conventional tone generator 11, microphone, or the like. The amplifier stage 14, per se, forms no part of the invention and may be considered to be conventional so far as the present disclosure is concerned. Briefly, it comprises a resistance 16, a source of plate potential 18, by-passed by a capacitor 20, and ground connections for the filament of the triode and for the battery 18. The amplified signal output appears at point 22.

The amplified voltage at point 22 constitutes the input signal for the volume attenuator, indicated as a whole by the reference character 24. The input signal passes through a network consisting of the capacitor 29 and the resistance 26 and through coupling capacitor 25 to the output connection at 28. From the junction of resistor 26, and capacitor 25, the conductor 30 is connected to the capacitor 32, the other side of which is connected to the terminals of two voltage-sensitive resistors 34 and 36. In one type of unit, suitable values are 100,000 ohms for the resistor 26, .0003 microfarad for the capacitor 29, one-half microfarad for the capacitor 32, and a maximum low voltage resistance of two megohms for each of the voltage-sensitive resistors 34 and 36.

Figure 3:
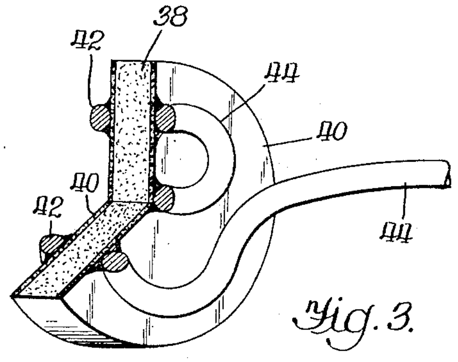
Figure 3 is a perspective, partly cut away, of a voltage-sensitive resistor.

The voltage-sensitive resistors are of the general type indicated in Figure 3. These are a common article of commerce of well-known characteristics, and, per se, form no part of the present invention. Briefly, each comprises a disk 38 of granular silicon carbide mixed with ceramic binder and fired at high temperature, with metal conducting plates 40 affixed to both sides. We have illustrated the plates 40 plated on the silicon carbide disk and soldered to wire connectors 42 and 44. Such voltage-sensitive resistors are non-polar and may be made with a wide range of characteristics. In the present combination, desirable characteristics are a reduction of resistance from the zero voltage resistance of about two megohms down to about 20,000 ohms when a voltage of about fifty volts is applied to the point 45. At each applied voltage there is one definite corresponding resistance value.

The network consisting of the resistor 26, capacitor 29, and the combination of voltage-sensitive resistors 34 and 36, in series with capacitor 32, forms a signal frequency voltage divider, the resistance of the bottom section being a function of the D. C. voltage applied to point 45.

Voltage-sensitive resistors 34 and 36 are in series with respect to D. C. voltage applied to point 45. But since point 45 is grounded to alternating current by capacitor 68, voltage-sensitive resistors 34 and 36 form parallel resistance paths to ground for alternating current appearing at point 35.

It will be apparent that when the parallel resistance of resistors 34 and 36 is about ten times the value of resistor 26, approximately ninety per cent of the signal will appear between point 27 and ground, and will be delivered to the output through coupling capacitor 25. The other ten per cent will appear across the resistor 26 and will be lost. But when the effective resistance of voltage-sensitive resistors 34 and 36 is lowered to one-twentieth of the value of resistor 26, by the application of a voltage to point 45, ninety five per cent of the input signal will be dissipated in resistor 26 and only five per cent will reach point 27. The capacitor 32 is a blocking condenser to prevent the D. C. potential at point 22 from being applied to the voltage-sensitive resistors. Ordinarily, its reactance is small at signal frequencies, so that it does not enter into the A. C. equivalent circuit calculation. However, an interesting, incidental advantage is that by selection of a value for capacitor 32, such that its reactance will begin to be appreciable at the lower signal frequencies, it is apparent that the attenuation of low frequencies at low volume levels will be less than the attenuation of the middle and high frequencies. In music, this is desirable, to compensate for the non-linear frequency response of the ear, at different listening levels.

The voltage-sensitive resistors ordinarily have a certain amount of inherent shunt capacitance, due to their physical construction. This capacitance tends to attenuate very high frequencies, and to compensate for this, the high frequencies are slightly emphasized by adding the capacitor 29 to the circuit, connected so as to shunt resistor 26.

Control means are provided for varying the resistance of the voltage-sensitive resistors 34 and 36 over the desired range. The control unit 46 includes the grounded rheostat arm 48 and a series of individual, fixed resistors 50, with suitable taps 52 positioned to be contacted by the arm 48. The battery 54 is arranged to provide sufficient voltage to reduce the resistance of voltage-sensitive resistors 34 and 36 to the desired minimum. From the battery 54 direct current flows through resistor 56, conductor 58, and resistor 60 back to ground. With the resistor 60 about ten times as great as the resistor 56, the potential at the end of resistor 60 would be nine-tenths of that delivered by the battery 54. This D. C. potential is connected to point 45 through the resistors of two RC resistance capacity time constant circuits arranged in series. In one satisfactory installation, we have employed a resistor 62 of about 4700 ohms with a capacitor 64 of three microfarads, for the first RC time constant circuit, which elements are a part of the control unit 46. The second RC time constant circuit is part of the volume attenuator 24 and comprises the resistor 66 of 33,000 ohms and the capacitor 68 of one microfarad.

The combined RC time constant circuits perform three useful functions. The first advantage is that when the arm 48 is moved from one position to the next, the changed voltage at point 58 reaches the point 45 only after both capacitors 64 and 68 have charged or discharged themselves through their companion resistors 62 and 66. It is easy to proportion the parts so that a rheostat with as few as six segments 50, instead of eight as shown on the drawing, is still effective to cause the volume to swell or diminish smoothly, as most musical compositions must when properly rendered. To obtain a substantially equivalent smoothness without the time constant circuits would require a rheostat with a much larger number of taps.

The other advantage is that if the operator swings the volume control arm 48 abruptly from one end of the rheostat to the other, the time-constant damping is effective to prevent the abrupt and jarring effects, which are a serious objection to many volume control means hitherto used on electronic organs. In fact, the values may easily be worked out so that the maximum speed with which it is possible for the operator to increase the volume comes out approximately the same as the maximum speed with which the operator of an ordinary pipe organ can throw the volume shutters open.

By using two RC time constant circuits in series, combined arrangements are facilitated in which one control unit controls the D. C. potential of a bus bar 70, to which the volume attenuators of a large number of different sets of equipment can all be connected. In such a combination, the values previously given for the resistor 62 and capacitor 64 are good working values, but the values for the resistor 66 and capacitor 68 in each different volume attenuator may be different, and selected for securing the best characteristics for that particular electronic unit.

The other main defect of volume controls for electronic musical instruments is noise in the music delivered, because the oscillations constituting the music must pass through a mechanical contact that is frequently shifted and that has series irregularities in contact resistance during the shifting movement. The same noise, for example, is frequently heard when adjusting the volume of a radio receiving set, but, because, after the volume is once set, the music is listened to without further shifting of any contacts, this momentary objection is easily tolerated. In achieving suitable volume control for a piece of music, however, the operator needs to be changing the volume control a good deal of the time as the music goes on, and therefore any discontinuity becomes a serious objection. The contacts made by the rheostat arm 48 are no more free from the chance of imperfect contact than any other mechanical contact, but no resulting noise ever gets into the signal leaving the output connection 28, because it is completely absorbed, or filtered out by the time constant or "filter" circuits.

Because the resistance of resistors 34 and 36 is an instantaneous function of the applied voltage, it is apparent that the change of voltage at the terminal 35 caused by the signal itself would vary the effective resistance of the voltage-sensitive resistors enough to distort the signal delivered at 28. By using two voltage-sensitive resistors connected as disclosed, and selecting matched resistors with substantially the same operating characteristics, any tendency to distortion due to irregular characteristics is effectively eliminated.

By having the maximum signal voltage a minor fraction of the voltage drop in each of the voltage-sensitive resistors 34 and 36, distortion due to the inherent properties of parallel circuits is minimized. Musical sound can be transmitted without objectionable distortion so long as the peak instantaneous voltage of the signal does not exceed five per cent of the undisturbed voltage drop in each voltage-sensitive resistor, but the best high-fidelity transmission calls for a signal maximum not greater than one or two per cent.

A material advantage of the invention is that the control unit involves direct current only and even that in very small amperages. Therefore, the control unit can easily be placed at a point separated from the volume modulator by a great distance if desired, and no special cable is needed to avoid attenuation or distortion of the signal. For instance, such a control unit in San Francisco could be connected through an ordinary telephone wire to a volume attenuator in New York, and the San Francisco operator could control an instrument in New York.

To use such a volume attenuator as part of an automatic expander, it is only necessary to disconnect the volume attenuator 24 from the manual control unit 46, and control the voltage of the conductor 70 with conventional equipment as a function of the intensity of the incoming signal. We have indicated a signal rectifier 72 receiving the signal from point 22, and delivering a rectified D. C. potential to a D. C. amplifier 74, which amplifier delivers to the conductor 70, through conductor 79, an amplified D. C. potential proportional to the intensity of the incoming signal. Thus, a phonograph record which has been electrically compressed in recording so as to have a small range of intensities may be expanded as much as desired to restore the intensity variation of the sound originally received, or even to exaggerate such variations. It will also be obvious that the same parts can be connected in reverse polarity to function as a volume compressor.

Where automatic expander and manual control are both wanted in a single unit, it is a simple matter to install a manual switch 78 for disconnecting the rectifier 72 from point 22, and a similar switch 80 for disconnecting amplifier 74 from the conductor 70. In this case, there is also provided a switch 82 for disconnecting the rheostat from the conductor 58 when only the automatic expander is desired. By closing the switches 78 and 82 and moving switch 80 to a third contact connected through a resistor 84 with the conductor 70, it is possible to have manual volume control superimposed on the automatic expander. It will be obvious that the relative effectiveness of the automatic and manual controls will depend on the relative values of the resistors employed.

Figure 2:
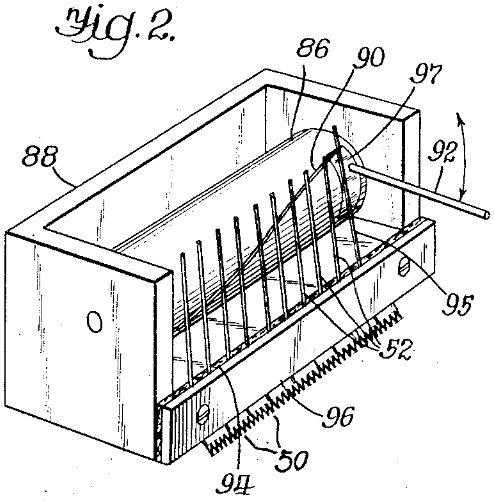
Figure 2 is a perspective of a convenient mechanical embodiment of step by step rheostat.

A convenient physical embodiment of the rheostat for the control unit is illustrated in Figure 2. The wooden barrel 86 is pivoted in a supporting box 88 and carries a small metal wire 90 arranged in a helix subtending an angle of about sixty degrees from end to end of the barrel. The manual control arm 92 is available to turn the barrel and the taps 52 may be simple, flexible wire ends pressing lightly against the barrel 86. The wire end 95 at the right end of the barrel is connected to ground and a shoe 97 keeps it in contact at all times. The resistors 50 are connected between the successive taps 52 as indicated in Figure 1. A simple and cheap, mechanical construction involves a felt pad 94 and a clamping strip 96 to hold all the wire ends 52 in place.

Because of the non-linear operating characteristics of the voltage-sensitive resistors 34 and 36, the values of the successive resistors 50 are best adjusted by trial and error. With none of the resistors 50 interposed between conductor 58 and ground, the potential of conductor 58 is a minimum and the volume of the output signal, a maximum. Each successive resistor 50 is given a value sufficient to result in substantially uniform decreases in the volume of the signal output, and accordingly the resistors 50 remote from the conductor 58 will have values up to one hundred times or so the values of the resistor nearest the conductor 58.

Where audible sounds are to be delivered, the output from capacitor 25 goes through one or more subsequent amplifiers at 100 to a loud speaker 102.

Others may readily adapt the invention for use under various conditions of service by employing one or more of the novel features disclosed or equivalents thereof. It will, for instance, be obvious that when the instrumentality delivering the signal to point 22 is unaffected by D. C. potential and does not itself impose any D. C. potential, capacitor 32 may be omitted. When capacitor 32 is used, it may also be placed between point 22 and resistance 26. By cascading two modulators between point 22 and capacitor 25, the ratio between maximum and minimum can be made many times greater. One stage of amplification in between the modulations may be desirable.

As at present advised, with respect to the apparent scope of our invention, we desire to claim the following subject matter:

1. Equipment for the distortionless transmission of electric audio-frequency oscillations of predetermined complex wave shape corresponding directly to the wave shape to be generated acoustically, comprising, in combination: a source of such complex oscillations; a voltage divider receiving said oscillations; said voltage divider comprising a fixed resistance and an instantaneously voltage-sensitive non-polar resistance connected in series; one end of said voltage divider being connected to said source and the other to ground; an output connection connected between said resistances; amplifying means connected to receive the output from said voltage divider; and operator-controlled adjusting means for effecting volume control of the divider output without distortion of wave form, by imposing on said voltage-sensitive resistance an adjustably controlled direct-current voltage that remains substantially constant during the time cycle of an audio-frequency oscillation.

2. Equipment according to claim 1 in which the output from the divider is the instantaneous audio-frequency voltage across said variable resistance.

3. Equipment according to claim 1 in combination with pre-amplifying means interposed between said source and said divider.

4. Equipment according to claim 3 in which said control means is a manually operated direct current potentiometer.

5. Equipment according to claim 4 in which an RC time-delay circuit is interposed between said potentiometer and said variable resistance to absorb irregularities resulting from instantaneous variations in contact resistance.

6. Equipment according to claim 4 in which the instantaneous voltage of the oscillation is a minor fraction of the direct current voltage impressed on said voltage-sensitive resistance by said potentiometer.

7. Equipment according to claim 1 in which said variable resistance is in two sections, connected to carry direct current in series and the oscillation current in parallel.

8. Equipment according to claim 7 in which the values of the sections of said variable resistance are approximately equal, and the voltage characteristics similar.

9. Equipment according to claim 8 in which said resistor sections are bodies of granular silicon carbide mixed with ceramic material and fired at high temperature.

10. Equipment according to claim 4 in which said potentiometer has a control member accessible to the operator and moveable in successive positions to vary the potential step by step.

11. Equipment according to claim 10 in which the successive steps of potentiometer adjustment are non-uniform and adjusted to secure predetermined approximately similar gradations in the intensity of the final sound produced.

12. Equipment according to claim 10 in combination with an RC time-delay circuit interposed between said potentiometer and said variable resistance; said RC circuit having enough capacity to smooth out the transition from one potentiometer position to the next.

13. Equipment according to claim 4 in combination with an additional attenuator controlled by the same potentiometer.

14. Equipment according to claim 1 in which the maximum instantaneous oscillation voltage is not more than five per cent of the direct-current potential drop in said non-polar voltage-sensitive resistance.

15. Equipment for the distortionless transmission of electric audio-frequency oscillations of predetermined complex wave shape corresponding directly to the wave shape to be generated acoustically, comprising, in combination: a source of such complex oscillations; a voltage divider receiving the output from said source; said voltage divider comprising a fixed resistance and an instantaneously voltage-sensitive non-polar resistance connected in series; one end of said voltage divider being connected to said source and the other to ground; an output connection connected between said resistances; amplifying means connected to receive the output from said voltage divider; and automatic means rendered operative by the received signal for imposing on said voltage-sensitive resistance, a direct-current control voltage which is a function of the intensity of the received signal.

16. Equipment according to claim 15 in which said control voltage is applied to increase the attenuation as the received signal becomes stronger.

17. Equipment according to claim 15 in which said control voltage is applied to decrease the attenuation as the received signal becomes stronger.

18. Equipment according to claim 15 in combination with an operator-controlled direct-current potentiometer; and connections for imposing on said voltage-sensitive resistance a direct-current voltage which is a combined function of the potentiometer voltage and the signal-controlled voltage.

References Cited in the file of this patent

UNITED STATES PATENTS

| | | |
|---|---|---|
| 2,036,691 | Gourov | Apr. 7, 1936 |
| 2,156,658 | Shore | May 2, 1939 |
| 2,193,966 | Jones | Mar. 19, 1940 |
| 2,233,061 | Peterson | Feb. 25, 1941 |
| 2,486,208 | Rienstra | Oct. 25, 1949 |
| 2,548,913 | Schreiner et al. | Apr. 17, 1951 |